(12) United States Patent
Williams et al.

(10) Patent No.: US 6,892,258 B1
(45) Date of Patent: May 10, 2005

(54) HARDWARE SEMAPHORES FOR A MULTI-PROCESSOR SYSTEM WITHIN A SHARED MEMORY ARCHITECTURE

(75) Inventors: Kalvin E. Williams, Thatcham (GB); John S. Holcroft, Woking (GB); Christopher J. Lane, Reading (GB)

(73) Assignee: LSI Logic Corporation, Milpitas, CA (US)

( * ) Notice: Subject to any disclaimer, the term of this patent is extended or adjusted under 35 U.S.C. 154(b) by 459 days.

(21) Appl. No.: 10/015,076

(22) Filed: Oct. 26, 2001

(51) Int. Cl.[7] .......................... G06F 13/14; G06F 13/00
(52) U.S. Cl. ................. 710/241; 710/107; 711/163
(58) Field of Search ................. 710/200, 240, 710/241, 108, 107, 36; 711/163, 152, 151, 141, 150; 712/228; 709/102; 718/103

(56) References Cited

U.S. PATENT DOCUMENTS

| | | | | |
|---|---|---|---|---|
| 4,380,798 A | * | 4/1983 | Shannon et al. | 710/241 |
| 4,780,822 A | * | 10/1988 | Miller | 710/241 |
| 5,050,072 A | * | 9/1991 | Earnshaw et al. | 710/108 |
| 5,276,886 A | * | 1/1994 | Dror | 710/240 |
| 5,634,038 A | * | 5/1997 | Saitoh | 711/163 |
| 5,669,002 A | * | 9/1997 | Buch | 710/200 |
| 5,696,939 A | * | 12/1997 | Iacobovici et al. | 711/150 |
| 5,951,662 A | * | 9/1999 | Tissot | 710/107 |
| 6,018,785 A | * | 1/2000 | Wenniger | 710/200 |
| 6,263,425 B1 | * | 7/2001 | Falik | 712/228 |
| 6,389,515 B1 | * | 5/2002 | Schibinger et al. | 711/141 |
| 6,493,805 B2 | * | 12/2002 | Nieuwland et al. | 711/152 |
| 6,549,961 B1 | * | 4/2003 | Kloth | 710/36 |
| 6,560,627 B1 | * | 5/2003 | McDonald et al. | 718/103 |
| 6,594,736 B1 | * | 7/2003 | Parks | 711/151 |
| 2002/0165896 A1 | * | 11/2002 | Kim | 709/102 |

FOREIGN PATENT DOCUMENTS

| JP | 01321525 A | * | 12/1989 | G06F/9/46 |
|---|---|---|---|---|

* cited by examiner

*Primary Examiner*—Glenn A. Auve
*Assistant Examiner*—Christopher E. Lee
(74) *Attorney, Agent, or Firm*—Christopher P. Maiorana PC

(57) ABSTRACT

A circuit generally comprising a memory element and a controller. The memory element may define a semaphore allocatable to a resource. The controller may be configured to (i) present a granted status in response to a processor reading a first address while the semaphore has a free status, (ii) set the semaphore to a busy status in response to presenting the granted status, and (iii) present the busy status in response to the processor reading the first address while the semaphore has the busy status.

21 Claims, 6 Drawing Sheets

HARDWARE SEMAPHORES FOR A MULTI-PROCESSOR SYSTEM WITHIN A SHARED MEMORY ARCHITECTURE

FIELD OF THE INVENTION

The present invention relates to a method and/or architecture for implementing semaphores generally and, more particularly, to a method and/or architecture for hardware semaphores within a multi-processor system.

BACKGROUND OF THE INVENTION

A conventional processor executing real-time operating systems commonly executes several software programs in a time-sliced fashion. The software programs therefore compete with each other for use of system resources. Resource contentions are commonly prevented by employing semaphores between the software tasks. Software-based semaphores are created within the software by progressing through a section of "critical" code where task switching is prevented and memory (where a software semaphore would be stored) accessed while all task switching/interrupt servicing is suspended. Executing the "critical" code can involve servicing exceptions that are relatively time consuming and processor intensive.

The resource contention problem grows significantly when multiple processors are used in the system implementing a unified memory mapping. Each processor commonly requires access to shared resources such as shared regions of memory for inter-processor command passing and shared use of system peripherals such as a Data Move Engine with Direct Memory Access capabilities. Since each task and processor will function independently, a system of semaphores is required to ensure that operations are sequenced correctly (i.e., while a resource is in use, an active semaphore ensures that no other task uses the resource).

Multi-processor software semaphore implementations commonly require some form of communication between processors to lock out all processors from the shared resource while a semaphore is written. The inter-processor communication in itself requires semaphores to control the shared memory necessary for command passing and so the system becomes unstable. Running the critical code to set the semaphores conventionally involves locking out all system interrupts and so can cause timing issues with regard to true real-time operation. A resource shared between processors requires that the sharing processors be locked within a safe state. In other words, the sharing processors must not switch tasks or service interrupts.

SUMMARY OF THE INVENTION

The present invention concerns a circuit generally comprising a memory element and a controller. The memory element may define a semaphore allocatable to a resource. The controller may be configured to (i) present a granted status in response to a processor reading a first address while the semaphore has a free status, (ii) set the semaphore to a busy status in response to presenting the granted status, and (iii) present the busy status in response to the processor reading the first address while the semaphore has the busy status.

The objects, features and advantages of the present invention include providing a method and/or architecture for hardware semaphores within a multi-processor system that may (i) operate independently of critical sections of code, (ii) provide read-modify-write access patterns to both request and set the semaphores within a single operation, (iii) provide a more robust solution than the software semaphore equivalent, (iv) minimize processor involvement in setting and resetting the semaphores, (v) permit allocation and reallocate of the semaphores to the resources as needed, and/or (vi) cascade the semaphores so that a semaphore may be used to mark another set of semaphores as "in use".

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
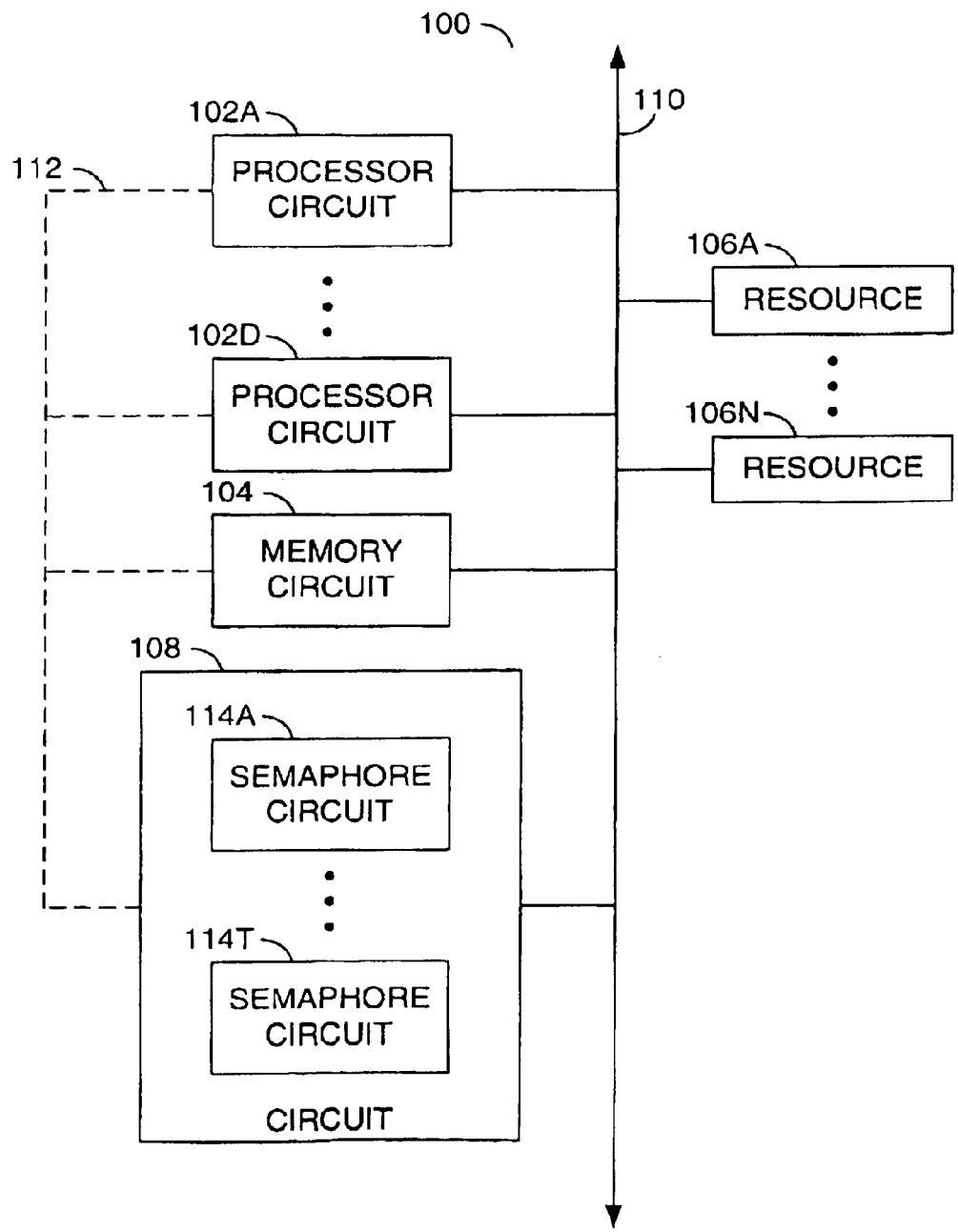
FIG. 1 is a block diagram of a system incorporating the present invention.

Referring to FIG. 1, a block diagram of a system 100 is shown incorporating the present invention. The system 100 may be implemented as a multi-processor system within a shared memory architecture. The system 100 may include system-on-chip designs incorporating a unified memory map architecture, board level designs, multi-board box level designs, and the like.

The system 100 generally comprises one or more processors 102A–D, a memory circuit 104, one or more resources 106A–N, a circuit 108, and a bus 110. The processors 102A–D may communicate with each other, the memory circuit 104, the resources 106A–N and the circuit 108 on the bus 110. The system 100 may include an optional second bus 112. The processors 102A–D may communicate with each other, the memory circuit 104, and/or the circuit 108 on the second bus 112.

The processors 102A–D may be executing multiple software tasks (not shown) in a real-time operating system environment. The memory circuit 104 may be implemented as a shared memory circuit accessible to some or all of the processors 102A–D. The resources 106A–N may be implemented as a variety of shared hardware and/or software resources of the system 100. Examples of the resources 106A–N may include, but are not limited to, mass memory controllers, communication circuits, input/output circuits, video processors, audio processors, network interface circuits, memory circuits (e.g., the memory circuit 104), and the like. The bus 110 may be implemented as a main or system type bus. The bus 112 may be implemented as a local or private type bus.

The circuit 108 may be implemented as a dedicated hardware block having multiple circuits 114A–T. Each circuit 114A–T may be implemented as a semaphore circuit defining a semaphore. Each semaphore circuit 114A–T may appear to the rest of the system 100 as one or more system registers with read-modify-write capabilities. Each semaphore may be configured to be set and reset within a single memory access (e.g., a read or a write) to a respective semaphore circuit 114A–T.

The semaphores may be defined independently of the resources 106A–N. There may be fewer, as many as, or more semaphores as resources 106A–N available in the system 100. Allocation and re-allocation of the semaphores to the resources 106A–N may be provided by the software as required. A semaphore may also be cascaded to mark another set of one or more semaphores as "in use". Therefore, the semaphores of the circuit 108 may also be considered as part of the resources 106A–N.

Figure 2:
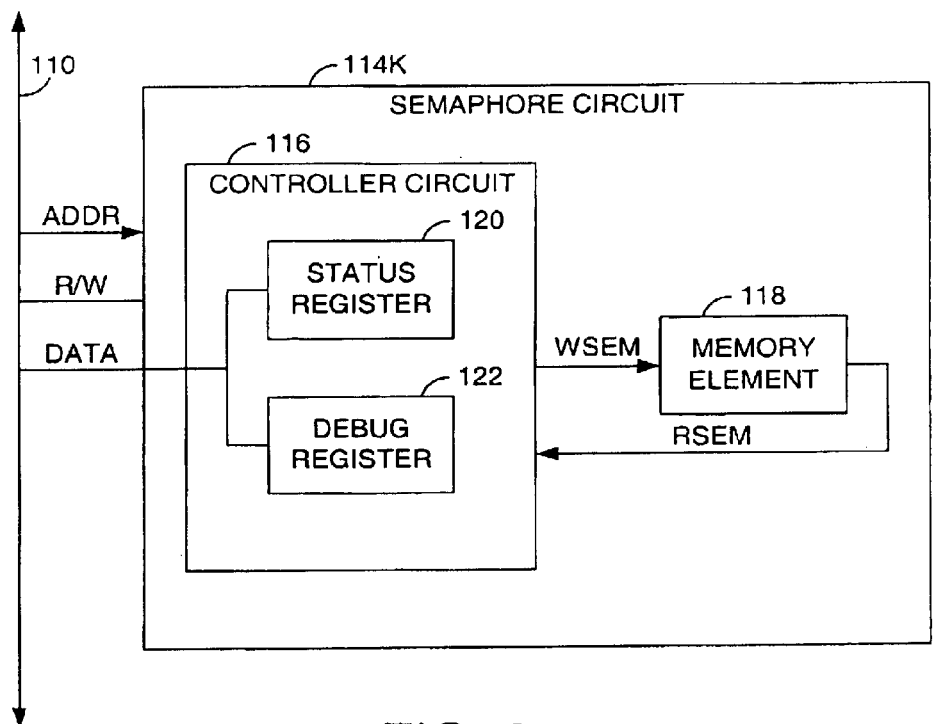
FIG. 2 is a block diagram of a semaphore circuit implementing a preferred embodiment of the present invention.

Referring to FIG. 2, a block diagram of an example semaphore circuit 114K implementing a preferred embodiment of the present invention is shown. All of the semaphore circuit 114A–T may have a common design to the semaphore circuit 114K. The semaphore circuit 114K may interface with either the system bus 110 or the second bus 112. For the purposes of discussion, the semaphore circuit 114K may be assumed to be interfaced with the system bus 110.

The semaphore circuit 114K generally comprises a controller circuit 116 and a memory element 118. The controller circuit 116 may present a signal (e.g., WSEM) to the memory element 118). The memory element 118 may present a signal (e.g., RSEM) to the controller circuit 116. The signal WSEM may be implemented as a semaphore status written to the memory element 118. The signal RSEM may be implemented as a semaphore status read from the memory element 118.

The controller circuit 116 may be configured to operate as a register 120 and a register 122 as seen from the system bus 110. The register 120 may be implemented as a status register accessible at an address. The register 122 may be implemented as a debug register accessible at another address.

The controller circuit 116 may receive a signal (e.g., ADDR) from the system bus 110. The controller circuit 116 may receive another signal (e.g., R/W) from the system bus 110. The registers 120 and 122 may exchange a signal (e.g., DATA) with the system bus 110.

The signal ADDR may be implemented as an address signal. The signal R/W may be implemented as a read/write signal. The signal DATA may be implemented as a data signal. The signal DATA may convey the semaphore status and other information.

The controller circuit 116 may respond to the signals ADDR, R/W, DATA, and RSEM to present the signal WSEM with a free status (value) or a busy status (value). The status conveyed by the signal WSEM may then be written into the memory element 118 as the status of the semaphore. The controller circuit 116 may respond to the signals ADDR, R/W, and RESM to present the signal DATA with the free status, the busy status, or a granted status (value). The signal DATA may then convey the semaphore status to the processors 102A–D.

Figure 3:
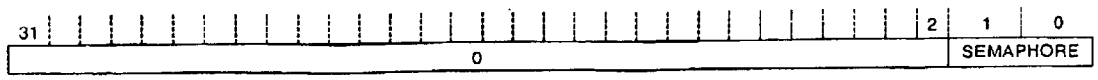
FIG. 3 is a drawing of semaphore data as seen by a processor.

Referring to FIG. 3, a drawing of the semaphore within the signal DATA is shown. The signal DATA may be implemented to match a width of the system bus 110. For example, the signal DATA may be implemented as a 32-bit wide signal. The semaphore may be embedded within two bits of the signal DATA, in particular, a bit zero and a bit one (e.g., DATA[1:0]). The remaining thirty bits of the signal DATA (e.g., DATA[31:2]) may be set to a logical zero value to simplify software testing. Other implementations of the signal DATA may be provided to meet the design criteria of a particular application. Status of the semaphore may be indicated by the signal DATA through the status register 120 as shown in TABLE 1 below:

TABLE 1

| Semaphore Status | Value Bit 1 | Value Bit 0 |
| --- | --- | --- |
| Granted | 0 | 1 |
| Busy | 0 | 0 |
| Free | 1 | 0 |
| Invalid Combination | 1 | 1 |

Status of the semaphore may be indicated by the signal DATA through the debug register 122 as shown in TABLE 2 below:

TABLE 2

| Semaphore Status | Value Bit 1 | Value Bit 0 |
| --- | --- | --- |
| Invalid Combination | 0 | 1 |
| Busy | 0 | 0 |
| Free | 1 | 0 |
| Invalid Combination | 1 | 1 |

Figure 4:
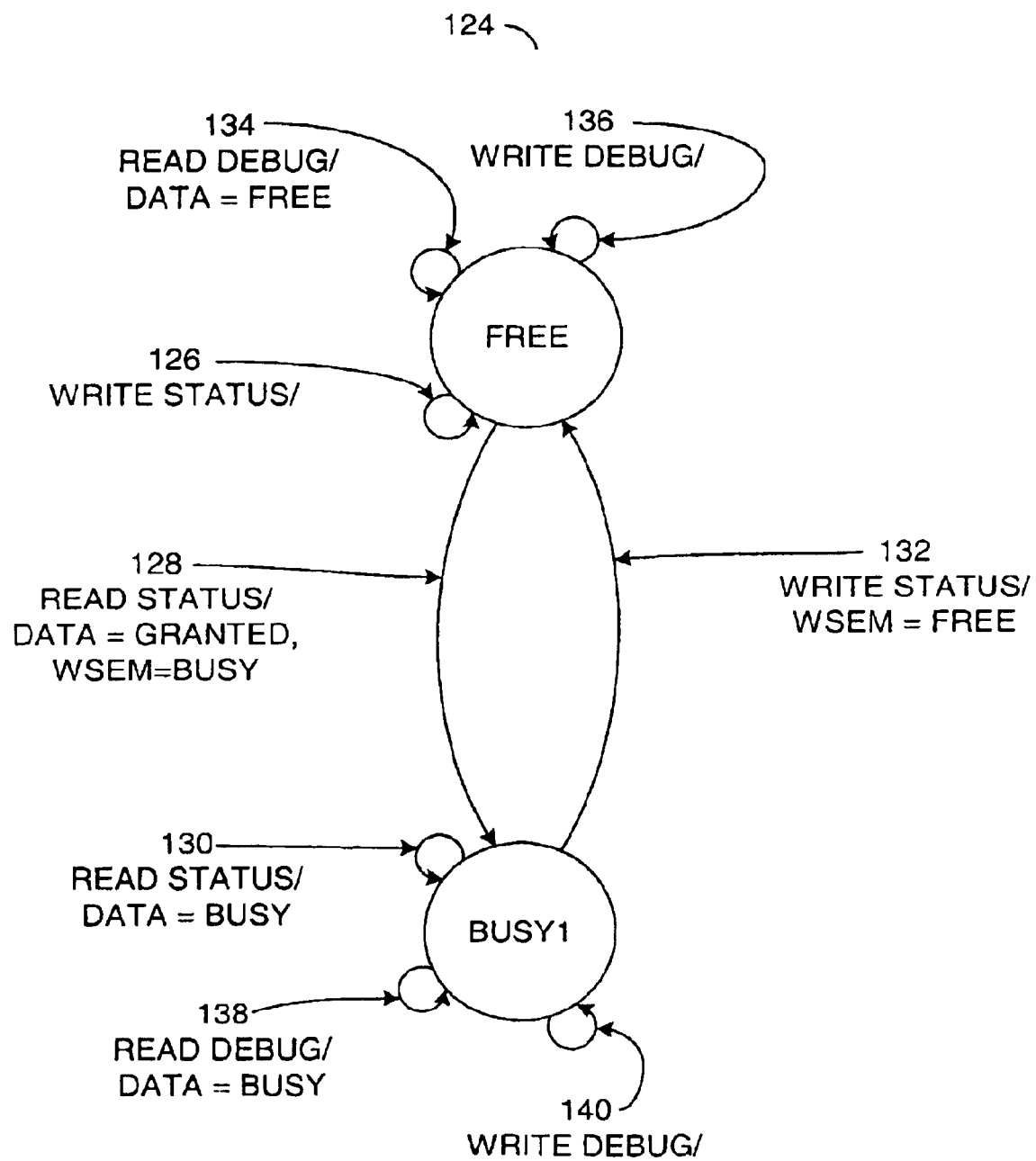
FIG. 4 is a state transition diagram.

Referring to FIG. 4, a state transition diagram 124 of the semaphore status is shown. Transitions in the state transition diagram 124 may be expressed as "trigger event/response". A phrase to the left of the slash "/" may define the trigger event that causes the transition to take place. A phrase to the right of the slash "/" may define the response, if any, presented due to the transition.

The semaphore may be determined by the logical state of the memory element 118. The semaphore may have either the free status (e.g., FREE state) or the busy status (e.g., BUSY1 state). Access to the semaphore by the processors 102A–D may be performed via the status register 120 and the debug register 122.

A discussion of the state transition diagram 124 may begin assuming that the semaphore has the free status and thus the state transition diagram 124 is in the FREE state. A write of any value by a processor 102A–D to the address of the status register 120 may trigger a transition 126. The transition 126 may maintain the FREE state and may not present any response. A read by a processor 102A–D to the address of the status register 120 may trigger a transition 128 to the BUSY1 state. A response to the transition 128 may be to present the signal DATA through the status register 120 with the granted status. Another response to the transition 126 may be to set the memory element 118 to the busy status with the signal WSEM.

From the BUSY1 state, any additional reads to the status register 120 may produce a transition 130. The transition 130 may maintain the BUSY1 state and present the busy status through the signal DATA. A write of any value to the status register 120 while in the BUSY1 state may trigger a transition 132. The transition 132 may transition the semaphore circuit 114K back to the FREE state. The transition 132 may also set the memory element 118 to the free status through the signal WSEM.

The processors 102A–D and any other master on the system bus 110 may read from and write to the debug register 122 without changing the semaphore status. Therefore, the debug register 122 may allow for non-intrusive examinations of the semaphores. From the FREE state, a read to the debug register 122 may trigger a transition 134. The transition 134 may maintain the FREE state and present the free status in the signal DATA. A write of any value to the debug register 122 may trigger a transition 136. The transition 136 may maintain the FREE state and not present any response.

From the BUSY1 state, a read of the debug register 122 may trigger a transition 138. The transition 138 may maintain the BUSY1 state and present the busy status through the signal DATA. A write of any value to the debug register 122 may trigger a transition 140. The transition 140 may maintain the BUSY1 state and not present any response.

As mentioned earlier, a semaphore may be considered one of the resources 106A–N that may be allocated to another semaphore. When semaphores are cascading, several different relationships may be provided among a "master" semaphore and the other "slave" semaphores being marked. For example, changing the status of the master semaphore may have no impact to the status or memory elements 118 of the slave semaphores. As a result, each processor 102A–D may need to understand that a non-interactive relationship exists between the semaphores. A read of the slave semaphore marked as busy by the master semaphore may still return the free status. Likewise, a read of the slave semaphore marked as free by the master semaphore may still return the busy status. A second master/slave relationship may force the busy status for the slave semaphore whenever the master semaphore transitions from the free status to the busy status. When the master semaphore transitions from the busy status to the free status, the second master/slave relationship may also transition the slave semaphore to the free status. A third relationship may return the slave semaphore to a prior status just before the master semaphore transitioned to the busy status.

Figure 5:
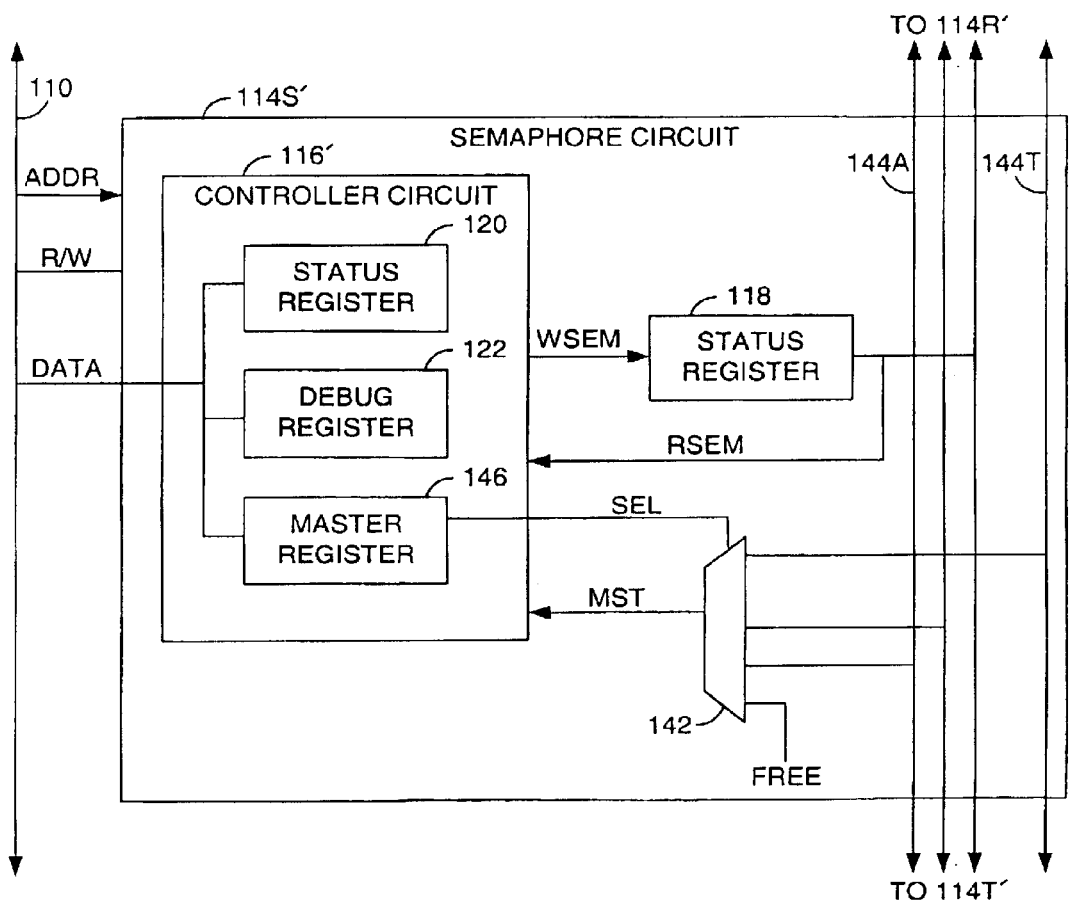
FIG. 5 is a block diagram of a second embodiment of the semaphore circuit.

Referring to FIG. 5, a block diagram of a second embodiment of a semaphore circuit 114K' is shown. The semaphore circuit 114K' may be configured to permit slave semaphores to actively respond to changes in the master semaphores. The semaphore circuit 114K' generally comprises a controller circuit 116', the memory element 118, and a multiplexer 142. The controller circuit 116' may receive the signals ADDR, R/W, and RSEM and present the signals DATA and WSEM. In addition, the semaphore circuit 114K' may have a plurality of lines 144A–T that interconnect some or all of the semaphore circuits 114A'–T'.

The multiplexer 142 may have inputs to receive each signal RSEM on lines 144A'–T except for the local signal RSEM (e.g., from the semaphore circuit 114K'). The input to the multiplexer 142 for the local signal RSEM may be hardwired to the free status. The multiplexer 142 may present a multiplexed signal (e.g., MST) to the controller circuit 1161. The signal MST may indicate a master semaphore to which the local semaphore (e.g., K) has been cascaded or slaved.

The controller circuit 116' may be further configured to have another register 146 visible on the system bus 110. The register 146 may be implemented as a master register. The master register 146 may present a signal (e.g., SEL) to the multiplexer 142. The signal SEL may be implemented as a select signal used by the multiplexer 142 to select which signal RSEM is presented as the signal MST.

The processors 102A–D may use the signals ADDR, R/W and DATA to control a master/slave relationship for the semaphore circuit 114K'. Writing a value for a semaphore circuit 114B' into the master register 146 of the semaphore circuit 114K' generally establishes the semaphore circuit 114B' as the master and the semaphore circuit 114K' as the slave. Writing a value for the semaphore circuit 114K' into the master register 146 of the semaphore circuit 114K' generally creates no master/slave relationship (e.g., the semaphore circuit 114K' is master to itself).

Figure 6:
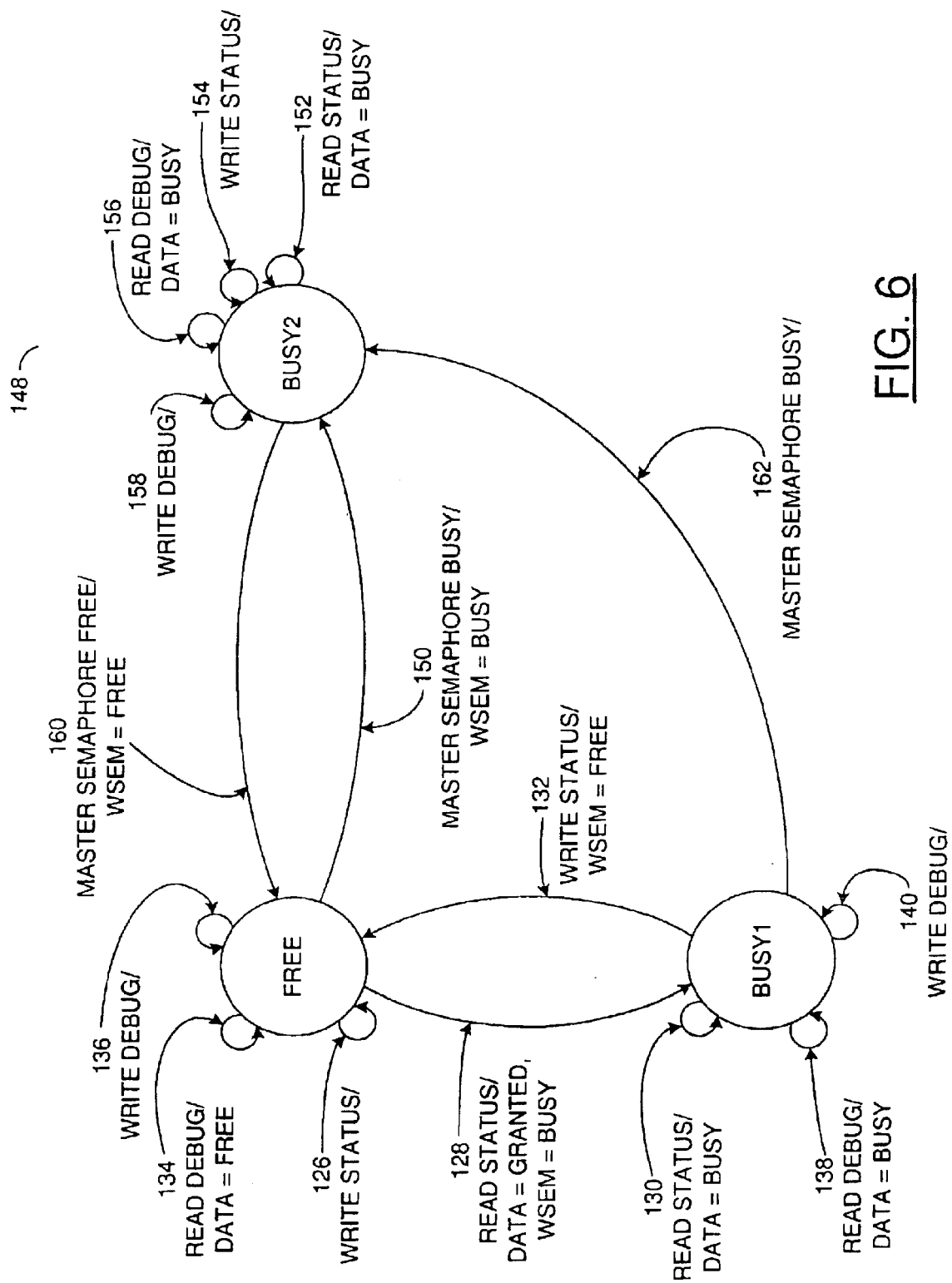
FIG. 6 is a second state transition diagram.

Referring to FIG. 6, a state transition diagram 148 for a controller circuit 116' of a slave semaphore circuit 114S' is shown. The state transition diagram 148 shows an example where the semaphore circuit 114S' has been actively slaved to a master semaphore circuit 114M'. The left half of the state transition diagram 148 may be identical to and operate the same as the state transition diagram 124 shown in FIG. 4. The state transition diagram 148 may include an additional busy state (e.g., BUSY2).

A read to the status register 120 of the master semaphore circuit 114M' may trigger a transition 150 from the FREE state to the BUSY2 state for the slave semaphore circuit 114S'. A response to the transition 150 may be to set the memory element 118 in the slave semaphore circuit 114S' to the busy state. Any subsequent read of the status register 120 of the slave semaphore circuit 114S' may trigger a transition 152. The transition 152 may leave the slave semaphore circuit 114S' in the BUSY2 state and respond by presenting the busy status.

A write to the status register 120 of the slave semaphore circuit 114S' while in the BUSY2 state may trigger a transition 154. The transition 154 may maintain the, BUSY2 state without presenting a response. A read of the debug register 122 of the slave semaphore circuit 114S' may trigger a transition 156. The transition 156 may maintain the BUSY2 state and respond by presenting the busy status. A write to the debug register 122 of the slave semaphore circuit 114S' may cause the transition 158. The transition 158 may maintain the BUSY2 state without producing a response.

A write to the status register 120 of the master semaphore circuit 114M' may cause the master semaphore to transition to the free status and trigger a transition 160 for the slave semaphore. The transition 160 may change the slave semaphore circuit 114M' from the BUSY2 state to the FREE state. A response to the transition 160 may also to set the memory element 118 in the slave semaphore circuit 114S' to the free status via the signal WSEM.

A transition of the master semaphore circuit 114M' to the busy status while the slave semaphore circuit 114S' is in the BUSY1 state may trigger a transition 162. The transition 162 may change to the slave semaphore circuit 114S' from the BUSY1 state to the BUSY2 state. The transition 162 may not produce a response since the memory element 118 in the slave semaphore circuit 114S' is already storing the busy status.

An effect of BUSY2 state may be to force the slave semaphore to have the busy status whenever the master semaphore transitions to the busy status. Another effect of the BUSY2 state may be to transition the slave semaphore to the free status whenever the master semaphore transitions from the busy status to the free status. In one embodiment, the slave resource may be configured to always have the same status as the master resource by allocating the slave resource directly to the same semaphore as the master resource.

Figure 7:
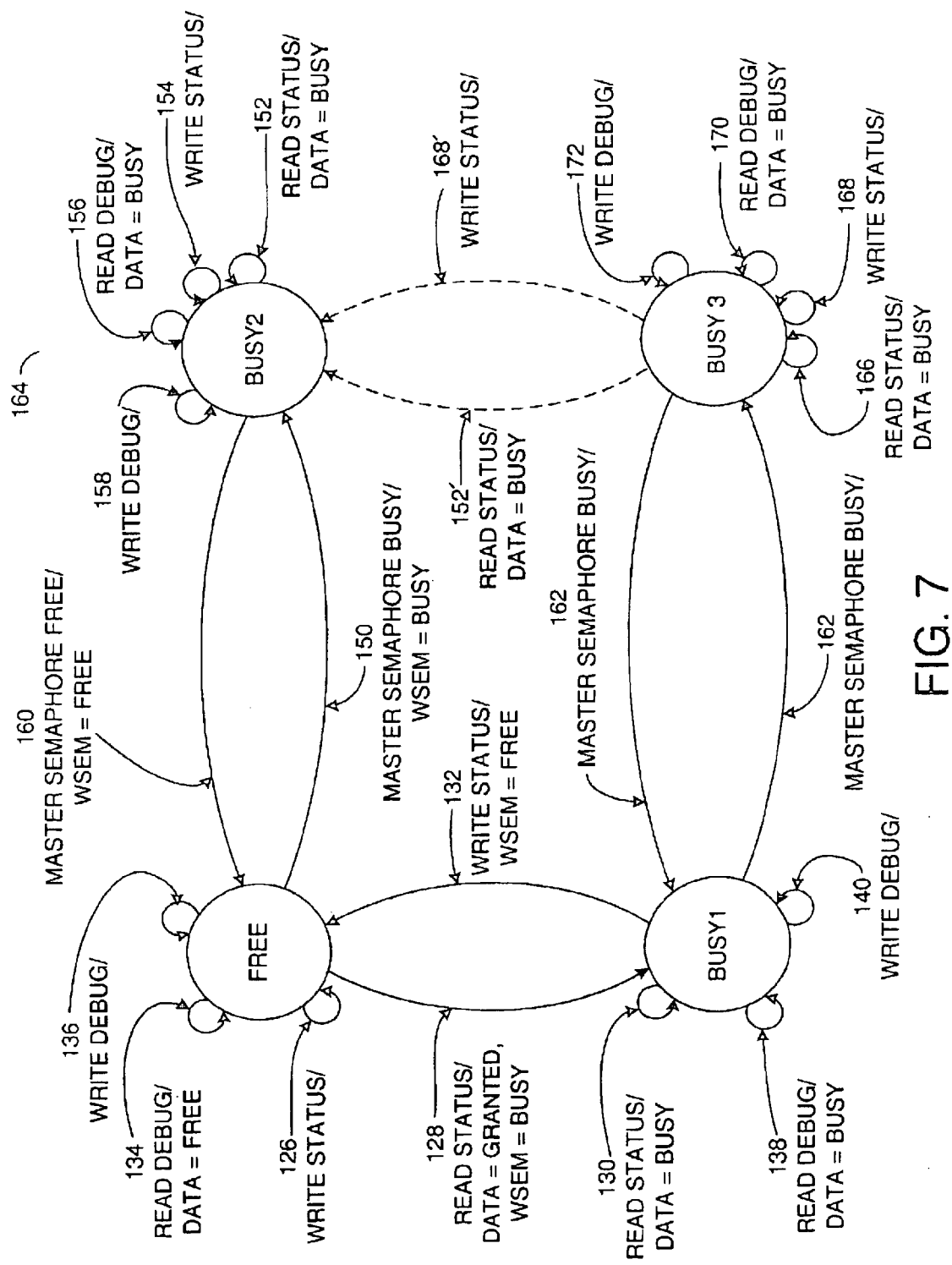
FIG. 7 is a third state transition diagram.

Referring to FIG. 7, another state transition diagram 164 for the controller circuit 116' of the slave semaphore circuit 114S' is shown. The state transition diagram 164 is similar to the state transition diagram 148 except for the transition 162. The transition 162 may transition the slave semaphore circuit 114S' from the BUSY1 state to another busy state (e.g., BUSY3) The BUSY3 state may allow the slave semaphore circuit 114S' to retain a history of being in the BUSY1 state when the master semaphore transitioned from the free status to the busy status.

From the BUSY3 state, a write to the status register 120 of the master semaphore circuit 114M' may cause a transition 165 in the slave semaphore circuit 114S'. The transition 165 may transition the slave semaphore circuit 114S' from the BUSY3 state to the BUSY2 state. No response may be necessary for the transition 165 since the memory element 118 of the slave semaphore circuit 114S' already stores the busy status.

A read of the status register 120 of the slave semaphore circuit 114S' while in the BUSY3 state may trigger a transition 166 that maintains the BUSY3 state and presents the busy status as the response. A write to the statue register 120 of the slave semaphore circuit 114S' may trigger a transition 168 that maintains the BUSY3 state without a response. A read of the debug register 122 of the slave semaphore circuit 114S' may trigger a transition 170 that maintains the BUSY3 state and presents the busy status as the response. A write to the debug register 122 of the slave semaphore circuit 114S' state may trigger a transition 172 that maintains the BUSY3 state with no response.

In one embodiment, the transitions 152 and 168 may be altered to permit transitions between the BUSY2 state and the BUSY3 state. The read from the status register 120 of the slave semaphore circuit 114S' while in the BUSY2 state may trigger a transition 152'. The transition 152' may change the slave semaphore circuit 114S' from the BUSY2 state to the BUSY3 state and produce the busy status as the response. The write to the status register 120 of the slave semaphore circuit 114S' while in the BUSY3 state may trigger a transition 168'. The transition 168' may change the slave semaphore circuit 114S' from the BUSY3 state to the BUSY2 state without producing a response.

Other master/slave relationships may be implemented to meet the design criteria of a particular application. For example, the semaphore circuits 114A–T may be modified so that the master semaphores are aware of and responsive to the status of the slave semaphores. The master semaphore may thus be in the FREE state only when all of the slaved semaphores are in the FREE state. In another example, the invalid "11" bit combination of the semaphore may be defined to indicate that the semaphore is slaved to another semaphore. Other variations of the semaphore encoding within the signal DATA may be implemented to meet the design criteria of a particular application.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
   a first memory element defining a first semaphore allocatable to a resource; and
   a first controller configured to (i) present a granted status in response to a processor reading a first address while said first semaphore has a free status, (ii) set said first semaphore to a busy status in response to presenting said granted status and (iii) present said busy status in response to said processor reading said first address while said first semaphore has said busy status; and
   a second memory element defining a second semaphore allocatable to said first semaphore.

2. The circuit according to claim 1, wherein said first controller is further configured to set said first semaphore to said free status in response to said processor writing to said first address.

3. The circuit according to claim 1, wherein said first controller is further configured to present said status of said first semaphore in response to said processor reading a second address.

4. The circuit according to claim 3, wherein said first controller is further configured to maintain said status of said first semaphore in response to said processor writing to said second address.

5. The circuit according to claim 1, wherein said first controller is further configured to (i) slave said first semaphore to said second semaphore, (ii) present said busy status in response to said processor reading said first address while said second semaphore has said busy status and (iii) maintain said busy status for said first semaphore in response to said processor writing to said first address while said second semaphore has said busy status.

6. The circuit according to claim 5, wherein said first controller is further configured to set said first semaphore to said free status in response to said processor writing to a second address.

7. The circuit according to claim 5, wherein said first controller is further configured to maintain said busy status for said first semaphore in response to said processor writing to a second address.

8. The circuit according to claim 1, further comprising a second controller configured to (i) present said granted status in response to said processor reading a second address while said second semaphore has said free status, (ii) set said second semaphore to said busy status in response to presenting said granted status and (iii) present said busy status in response to said processor reading said second address while said second semaphore has said busy status.

9. The circuit according to claim 8, wherein said second controller is further configured to set said second semaphore to said free status in response to said processor writing to said second address.

10. A method of allocating a resource to a processor, comprising the steps of:
    (A) defining a first semaphore allocatable to said resource;
    (B) presenting a granted status in response to said processor reading a first address while said first semaphore has a free status;
    (C) setting said first semaphore to a busy status in response to presenting said granted status;
    (D) presenting said busy status in response to said processor reading said first address while said first semaphore has said busy status; and
    (E) defining a second semaphore allocatable to said first semaphore.

11. The method according to claim 10, further comprising the step of setting said first semaphore to said free status in response to said processor writing to said first address.

12. The method according to claim 10, further comprising the step of presenting said status of said first semaphore in response to said processor reading a second address.

13. The method according to claim 12, further comprising the step of maintaining said status of said first semaphore in response to said processor writing to said second address.

14. The method according to claim 10, further comprising the step of:
    slaving said first semaphore to said second semaphore.

15. The method according to claim 14, further comprising the step of:

presenting said busy status in response to said processosr reading said first address while said second semaphore has said busy status.

16. The method according to claim 15, further comprising the step of:

maintaining said busy status for said first semaphore in response to said processor writing to said first address while said second semaphore has said busy status.

17. The method according to claim 16, further comprising the step of:

setting said first semaphore to said free status in response to said processor writing to a second address.

18. The method according to claim 16, further comprising the step of:

maintaining said busy status for said first semaphore in response to said processor writing to a second address.

19. The method according to claim 10, further comprising the steps of:

second presenting said granted status in response to said processor reading a second address while said second semaphore has said free status;

setting said second semaphore to said busy status in response to said second presenting of said granted status; and presenting said busy status in response to said processor reading said second address while said second semaphore has said busy status.

20. The method according to claim 19, further comprising the step of:

setting said second semaphore to said free status in response to writing to said second address.

21. A circuit comprising:

means for defining a first semaphore allocatable to a resource;

means for presenting a granted status in response to a processor reading a first address while said first semaphore has a free status;

means for setting said first semaphore to a busy status in response to presenting said granted status;

means for presenting said busy status in response to said processor reading said first address while said first semaphore has said busy status; and means for defining a second semaphore allocatable to said first semaphore.

* * * * *